United States Patent [19]
Beckwith et al.

[11] Patent Number: 5,214,008
[45] Date of Patent: May 25, 1993

[54] HIGH VISIBLE, LOW UV AND LOW IR TRANSMITTANCE GREEN GLASS COMPOSITION

[75] Inventors: Steven P. Beckwith, McMurray; William M. Yankovich, Bethel Park, both of Pa.

[73] Assignee: Guardian Industries Corp., Northville, Mich.

[21] Appl. No.: 870,415

[22] Filed: Apr. 17, 1992

[51] Int. Cl.$^5$ .............................................. C03C 3/085
[52] U.S. Cl. .................................... 501/69; 501/70
[58] Field of Search ............................. 501/69, 70

[56] References Cited

U.S. PATENT DOCUMENTS

| | | | |
|---|---|---|---|
| 1,961,603 | 6/1934 | Berger | 106/36.1 |
| 2,505,001 | 4/1950 | Nordberg | 49/79 |
| 2,755,212 | 7/1956 | Brown | 154/27 |
| 3,343,935 | 9/1967 | Keefer et al. | 65/121 |
| 3,345,190 | 10/1967 | Albinak et al. | 106/47 |
| 3,486,874 | 12/1969 | Rough | 65/335 |
| 3,578,430 | 5/1971 | Labrot | 65/157 |
| 3,652,303 | 3/1972 | Rao | 106/52 |
| 3,791,646 | 7/1976 | Rhodes | 65/157 |
| 3,951,635 | 4/1976 | Rough, Sr. | 65/135 |
| 4,381,934 | 5/1983 | Kunkle et al. | 65/135 |
| 4,493,557 | 1/1985 | Nayak et al. | 366/300 |
| 4,519,814 | 5/1985 | Demarest, Jr. | 65/27 |
| 4,529,428 | 7/1985 | Groetzinger | 65/27 |
| 4,539,034 | 9/1985 | Hanneken | 65/134 |
| 4,610,711 | 9/1986 | Matesa et al. | 65/134 |
| 4,701,425 | 10/1987 | Baker et al. | 501/70 |
| 4,792,536 | 12/1988 | Pecoraro et al. | 501/70 |
| 5,007,133 | 12/1991 | Cheng | 428/426 |

FOREIGN PATENT DOCUMENTS 60-21554 10/1985 Japan .
61-13693 6/1986 Japan .

OTHER PUBLICATIONS

W. A. Weyl, "Colored Glasses", pp. 89–120 and 238–281, 1946.
C. R. Bamford, "Color Generation and Control in Glass", 1977 pp. 35, 36, 78, 79, 106–109, 142–146.
G. F. Brewster and N. J. Kreidl, "The Color of Iron--Containing Glasses of Varying Composition", J. Soc. Glass Techn, 1950, pp. 332–406.
J. W. Forrest, N. J. Kreidl, Tyler G. Pett, "Color Variations in Glasses Containing Iron", J. Optical Soc. of Amer. vol. 38, No. 6, Jun. 1948, pp. 554–560.
N. E. Densem and W. E. S. Turner, "The Equilibrium Between Ferrous and Ferric Oxides in Glasses", J. Soc. Glass Techn, 1937, pp. 372–389.
Pincus & Davis, "Raw Materials in teh Glass Industry", Part II Chptr 87 (1983) pp. 260–278.
Alexis & Pincus, "Raw Materials in the Glass Industry", Part II (1983) pp. 384–397.
Bamford, "Optical Properties", Chptr 3, date not available.
Tooley, "The Hnadbook of Glass Manufacture", vol. 1 (1984) p. 37 et seq.
Swarts, "Solar Control Through Glass", Glass Industry vol. 45 (1964) pp. 177–182.
Weyl, *Colored Glasses*, pp. 220–233, 1946.

*Primary Examiner*—Mark L. Bell
*Assistant Examiner*—A. Wright
*Attorney, Agent, or Firm*—Myers, Liniak & Berenato

[57] ABSTRACT

A soda-lime-silica green glass favoring the yellow side, rather than the bluish side of the spectrum, is produced having high visible transmittance, low infrared energy transmittance, low ultraviolet radiation transmittance, and low total solar energy transmittance by manipulating the reduction of iron (as $Fe_2O_3$) to FeO and the percent of these two oxides to achieve these characteristics without the use of $CeO_2$ or other UV absorbing additives and by using conventional glass melting and refining apparatus.

11 Claims, 2 Drawing Sheets

HIGH VISIBLE, LOW UV AND LOW IR TRANSMITTANCE GREEN GLASS COMPOSITION

FIELD OF THE INVENTION

This invention relates to glass compositions having high visible, low ultraviolet, and low infrared transmittances. More particularly, this invention relates to such glass compositions which have unique applicability as automotive glasses including windshields, as well as for architectural use.

BACKGROUND OF THE INVENTION

It has long been known that soda-lime-silica glasses may be rendered green in color by the addition to the batch of various amounts of iron. It is somewhat conventional, in this respect, to express the total iron content as a weight percent expressed as $Fe_2O_3$ even though the iron may exist in various valence states in the glass. However, it is also well known that the balance within the total iron content of ferrous oxide (FeO) and ferric oxide ($Fe_2O_3$) can make a significant difference in the shade of green obtained, as well as in other characteristics of the glass. Generally speaking, for example, as the concentration of FeO increases in relation to $Fe_2O_3$, the color of the glass shifts from a yellow-green to a darker green or blue-green of lower visible transmittance.

Other characteristics of the glass change as the relationship of FeO to $Fe_2O_3$ (i e. ferrous to ferric content) shifts. For example, it is further known that iron in the ferrous state (FeO) is an absorber of infrared energy in glass. Unfortunately, as the FeO content increases at the expense of $Fe_2O_3$, the ultraviolet energy absorption decreases because $Fe_2O_3$ is a UV absorber. It has been further reported that at certain relatively high FeO concentrations thought desirable for high infrared absorption, heat penetration into the glass melt is severely restricted and special melting and refining apparatus has to be employed to achieve a homogeneous glass.

Representative of the above knowledge and other relevant information known to those skilled in the art with regard to making iron-containing soda-lime-silica green glasses having relatively high visible, low ultraviolet and low infrared transmittances, prior to this invention, are the discussions and inventions disclosed in U.S. Pat. No. 4,792,536 and U.S. Pat. No. 5,077,133 and the prior art cited and discussed therein.

The glasses in the preferred embodiments in both of these prior art patents seek, in their own way, to balance the ferric and ferrous contents by altering oxidation states to shift their respective amounts in order to achieve certain infrared absorption levels of the inventors' choosing, while maintaining the needed degree of visible transmittance. Then, in order to obtain the necessary degree of ultraviolet absorption, and thus appropriate levels of total solar transmittance, both patents teach to add cerium oxide ($CeO_2$) to the composition. U.S. Pat. No. 4,792,536 does disclose certain other UV absorbing additives that may be used in place of $CeO_2$, such as $TiO_2$, $V_2O_5$ and $MoO_3$. U.S. Pat. No. 5,077,133, on the other hand, states that it is critical to use $CeO_2$ in the practice of its invention, but contemplates that some of the $CeO_2$ may be complemented by using $TiO_2$ in admixture with it.

All of these UV absorbing additives are expensive, particularly $CeO_2$. In addition, they create their own problems in the composition. For example, additives other than $CeO_2$ are reported as having an adverse effect on visible transmittance. On the other hand, in addition to being expensive and having its own adverse effect upon visible transmittance, $CeO_2$ inhibits reduction of $Fe_2O_3$ to FeO (i.e. ferric to ferrous iron).

Another problem regarding the manufacture of acceptable green glasses, as reported in U.S. Pat. No. 4,792,536, is that the presence of sulfur in the glass inhibits reduction of $Fe_2O_3$ to FeO. Unfortunately sulfur, for example in the form of sodium sulfate ("Salt Cake" $Na_2SO_4$) is a known inexpensive, and valuable refining agent for soda-lime-silica glasses, particularly those to be made by the conventional "float" process as flat glass for architectural and/or automotive purposes. Because of its inhibiting effect on the reduction of $Fe_2O_3$ to FeO, U.S. Pat. No. 4,792,536 seeks to severely limit the amount of sulfur ($SO_3$) in the glass composition. Then, to achieve its overall purposes, this patent minimizes the total iron content, preferably to about 0.45% to 0.65% by weight of the total glass composition (to preserve visible transmittance) and forms the glass under reducing conditions, so as to create from this modest amount of iron greater than 35% and most preferably at least 50% by weight of the total iron content in the ferrous state (as FeO). Infrared transmittances no greater than 15% are said to be achieved.

According to the examples presented in the '536 patent, when the glasses are reduced to the desired level to obtain this IR transmittance, and because of the low total iron content, UV transmittance increases due to the small amount of ferric iron remaining. This, in turn, necessitates additives such as $CeO_2$, etc. for UV absorption. Thusly, in most of the examples visible transmittance (reported as "$LT_A$") still rarely comes close to reaching 70%, a desirable, and sometimes necessary, level of visible transmittance for automotive glasses. For example, of the glass compositions of the patented invention reported in the Tables in this patent which do not employ special UV absorbing additives (e.g. $CeO_2$), only Composition 14 has a visible transmittance of 70% or greater. (Example 11 does, but it is said to be insufficiently reduced, and employs 1.0% cerium oxide). Because Composition 14 does not employ $CeO_2$ or any other of the above-referenced UV absorbing oxides (i.e. $TiO_2$, $MoO_3$ or $V_2O_5$) ultraviolet transmittance, even at 5 mm, is a very high 51.3%. This latter value renders these glasses rather unacceptable for certain automotive uses. In some instances, furthermore, the "tilt" toward a bluish-green color also makes many of these compositions undesirable for certain customer specifications.

This '536 patent also discloses four "prior art" glass compositions. Composition 1 is a conventional green glass whose solar blocking is shown to be inferior. Compositions 2-4, while somewhat closer in iron content to the glasses of our invention, nevertheless suffer in one or more respects in their solar management characteristics, even when reduced in thickness to less than 5 mm, as compared to the glasses of our invention. In this respect, Composition 2 is actually a different glass than our invention because of its high $Al_2O_3$ and $K_2O$ content, making it difficult to produce by the "float process", a process particularly preferred for use in our invention. Composition 3 is also significantly different in its $SO_3$ content from that contained in the glasses of our invention (a rather narrow and critical range of about 0.20-0.25% by weight, as stated below), making the glass of Composition 3 difficult to refine. Its FeO/Fe$_2$O$_3$ content is also quite high compared to our invention, thus resulting in a relatively high UV transmittance when its thickness is less than 5 mm. Composition 4 is so highly reduced that it has a very high UV transmittance compared to our glasses. In addition, this composition, producible only by special techniques is not applicable for use in the float process.

In contrast to the iron minimizing, low sulfur compositions of U.S. Pat. No. 4,792,536, the glass compositions of U.S. Pat. No. 5,077,133 seek to achieve green glasses through the use of relatively high total iron content concentrations. These glasses also employ conventional salt cake in their batch for refining purposes and are said to require only conventional melting and refining apparatus. They are generally colored toward the yellow-green side, as opposed to the bluer greens of the '536 patent.

U.S. Pat. No. 5,077,133 seeks to differentiate itself from the above-referenced U.S. Pat. No. 4,792,536 (at col. 2, line 40 et seq.). It does so, in part, by pointing out the rather low levels of iron employed in this latter patent and the resulting characteristics achieved thereby in the final glass. U.S. Pat. No. 5,027,133 states that, in contrast, its glasses employ higher levels of total iron content, and, by carefully controlling the ratio of FeO to total iron content (expressed as Fe$_2$O$_3$) and the critical use of certain specific concentrations of CeO$_2$ (alone or with TiO$_2$) superior color and transmittance characteristics are achieved.

More specifically, U.S. Pat. No. 5,077,133 states that, using high total iron content within certain limits, certain specific FeO to total iron content ratios (by reduction) and specific values of CeO$_2$, Illuminant A visible light transmittance is greater than 70%, total solar energy transmittance is less than about 46%, ultraviolet radiation transmittance is less than about 38% and preferably is less than about 34%. This patent further states that Illuminant C dominant wavelength is from about 498 to about 525 nm, and that the glass displays a color purity of about 2% to 4% compared to the blue glass of the prior '356 patent which is said to be up to about 10%. At least some of these characteristics are, of course, thickness dependent and for this reason, it is stated that these combined results are achieved with glasses (single sheet or more) having a total thickness of 3 mm to 5 mm.

While U.S. Pat. No. 5,077,133 states that it achieves "low infrared energy" transmittance (e.g. col. 7, lines 1-2), it does not disclose what that value, or range of values, is. Using the formula presented in U.S. Pat. No. 4,792,536 (at col. 13, line 50), it can be calculated that IR transmittance (TSIR) in the '133 patent is on the order of about 17% to 33%.

The transmittance, purity and color characteristics reported in U.S. Pat. No. 5,077,133 are desirable characteristics to achieve, particularly in the automotive field for windshields, side and rear windows, and other automotive glass. However, the use of CeO$_2$, either alone or with TiO$_2$, is an undesirable and detrimental drawback to the invention disclosed in that patent, as it is in the prior U.S. Pat. No. 4,792,536.

It is, therefore, apparent from the above that there exists a need in the art for a glass composition which achieves the transmittance and color properties generally as disclosed in U.S. Pat. No. 5,077,133, without having to employ special UV absorbing additives such as CeO$_2$, heretofore believed necessary in the prior art to achieve proper UV absorption.

It is a purpose of this invention to fulfill this and other needs in the art which will become more apparent to the skilled artisan once given the following disclosure.

SUMMARY OF THE INVENTION

Generally speaking, this invention fulfills the above-described needs in the art by providing a green-colored, infrared energy and ultraviolet radiation absorbing glass consisting essentially of, by weight: about 71–74% SiO$_2$; about 12–20% Na$_2$O; about 8–10% CaO; about 3–5% MgO; about 0.10–0.30% Al$_2$O$_3$; about 0–0.1% K$_2$O; about 0.20–0.25% SO$_3$; about 0.7–0.95% total iron expressed as Fe$_2$O$_3$; about 0.19–0.24% ferrous iron expressed as FeO (preferably 0.20–0.24%), and wherein the glass at thicknesses of about 3.7 mm–4.8 mm has a visible transmittance of greater than about 70%; an ultraviolet transmittance of less than about 38%, and a total solar transmittance of less than about 44.5%.

In certain preferred embodiments the glasses of this invention, when at a thickness of about 3.7 mm–4.8 mm, in addition to the above-described transmittance, have a color purity of about 2–4% and an Illuminant C dominant wavelength from about 495 to about 510 nm and, most preferably, about 500–502 nm. This wavelength, together with color purity of about 2%–4%, denotes a very pleasing and aesthetic green color slightly to the yellowish side, as opposed to the bluish side of the spectrum. It is, therefore, capable of meeting certain specifications of end users demanded in the automotive industry.

In certain further preferred embodiments the glasses as above-described are produced under reducing conditions, such that the ratio of FeO to total iron (expressed as Fe$_2$O$_3$) calculated by the method of U.S. Pat. No. 4,792,536 is about 0.24–0.27 and the percent reduction to FeO calculated by the method of U.S. Pat. No. 5,077,133 is about 25%–29%.

The method of calculating percent reduction of total iron in U.S. Pat. No. 5,077,133 is reported at column 4, lines 28–44 of that patent. This disclosure and method is incorporated herein by reference, as is the method of calculating the ratio of FeO to total iron employed in U.S. Pat. No. 4,792,536. Unless otherwise specified, the percent reduction of total iron to FeO means that obtained by the optical density formula and technique of the '133 patent and the ratio of FeO to total iron means that ratio as calculated by the method of the aforesaid '536 patent.

In all embodiments envisioned by this invention, the glass composition is devoid of any effective amount of CeO$_2$, TiO$_2$, MoO$_3$, or V$_2$O$_5$ sufficient to significantly absorb UV radiation (i.e only trace amounts inherent as impurities in the batch may exist, and then only in very small amounts, normally less than 0.1% by weight, e.g. TiO$_2$ of about 0.02%). Indeed, it is a distinct purpose and characteristic of this invention not to use such additives. The term "consisting essentially of" is used herein to denote this purpose and characteristic of the glass compositions of this invention.

It is understood that the IR, UV and total transmittances referred to in the above patents, and as used herein, are solar transmittances. A determination of these solar energy transmittances as described in this invention (except for visible transmittance) are calculated by the conventional Simpson Parabolic Rule integration technique for purposes of accuracy. This technique is described in certain fundamental texts such as Gillet, *Calculus and Analytical Geometry* D.C. Health & Co. Chptr. 10 pg. 440. In this respect, however, infrared radiation transmittance may either be specifically determined by Simpson's Rule, or calculated once the other values are known, by the formula:

$$TSET = 0.44 LT_A + 0.53 TSIR + 0.03 TSUV$$

wherein TSET is the total solar energy transmittance, $LT_A$ is the luminous or visible transmittance, TSIR is the infrared transmittance, and TSUV is the ultraviolet transmittance. Using this formula or by measurement, the preferred glasses of this invention usually have an infrared transmittance of between about 18-21%, at thickness of about 3.7 mm-4.8 mm. With respect to these transmittances, visible transmittance is measured by the Illuminant A technique (380-770nm); total solar transmittance is measured by Simpson's Rule (300-2100nm); UV transmittance is measured by Simpson's Rule (300-400 nm), and IR transmittance is measured by Simpson's Rule or calculated as stated above (800-2100 nm). Color is designated by dominant wavelength and color purity and reference to Illuminant C and/or Illuminant D-65. Color purity and dominant wavelength are determined by the standard Illuminant C x,y chromaticity diagram technique. All of the above are conventional designations in the art, well known to the skilled artisan.

It is to be further understood, with regard to the above-described characteristics, that many of them are thickness dependent. Thus reference is made in referring to the ranges of the characteristics as being applicable when the glasses have a thickness of 3.7 mm-4.8 mm. That does not necessarily mean, however, that a single sheet of glass is that thick. It merely means that the total thickness of the glass in the structure, if it resides within that range, would have these characteristics. For example, in automotive glass, while some glass sheets are individually 4 mm thick, two glass sheets of 2 mm each may often be placed together (e.g. for windshields and some body glass). As another example, somewhat thicker windshields require two, 2.3 mm thick glass sheets. It is, of course, known and often required to employ in windshields a plastic laminate of about 0.8 mm between the sheets (e.g. DuPont Butecite or a vinyl laminate made by Sekisui Corp. of Japan, each having an index of refraction the same as the glass and which may be tailored to have its own UV absorbing characteristics). In the instances where the glass sheets are 2 mm thick, the total thickness of a laminated windshield is approximately 4.8 mm (although the total glass thickness is 4 mm). In the instances where the glass sheets are 2.3 mm thick, the total thickness of the windshield is approximately 5.1 mm (although the total glass thickness is 4.6 mm). All are considered to be within the scope of this invention.

This invention will now be described with respect to certain embodiments thereof, as well as with reference to certain illustrations in which:

IN THE DRAWINGS

DETAILED DESCRIPTION OF THE INVENTION

The glasses contemplated by this invention may be formulated from standard batch ingredients well known in the art. These batch ingredients may then be melted and refined using conventional apparatus and techniques. Special apparatus as shown in U.S. Pat. No. 4,792,536, in this respect, is not needed.

Figure 1:
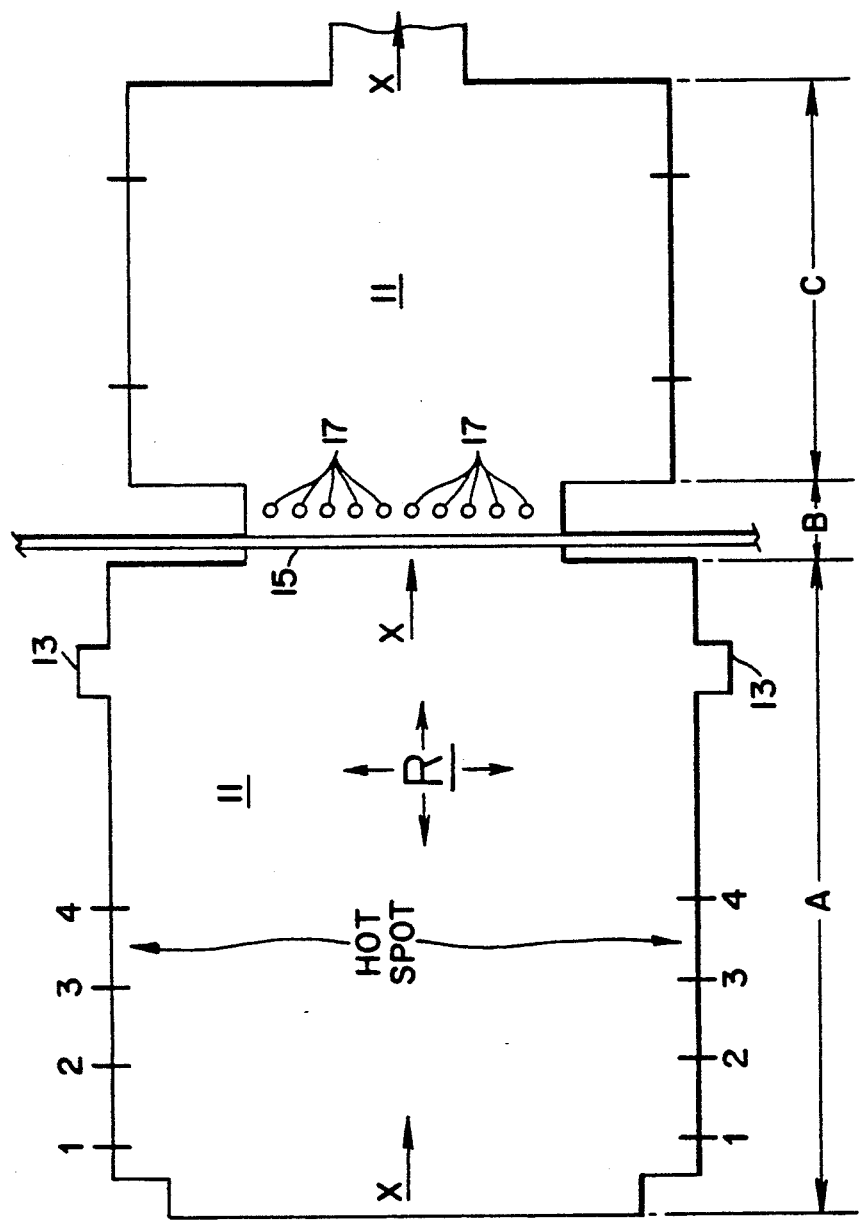
FIG. 1 is a top schematic view of a conventional melting and refining apparatus useful for producing the glasses according to this invention.
Figure 2:
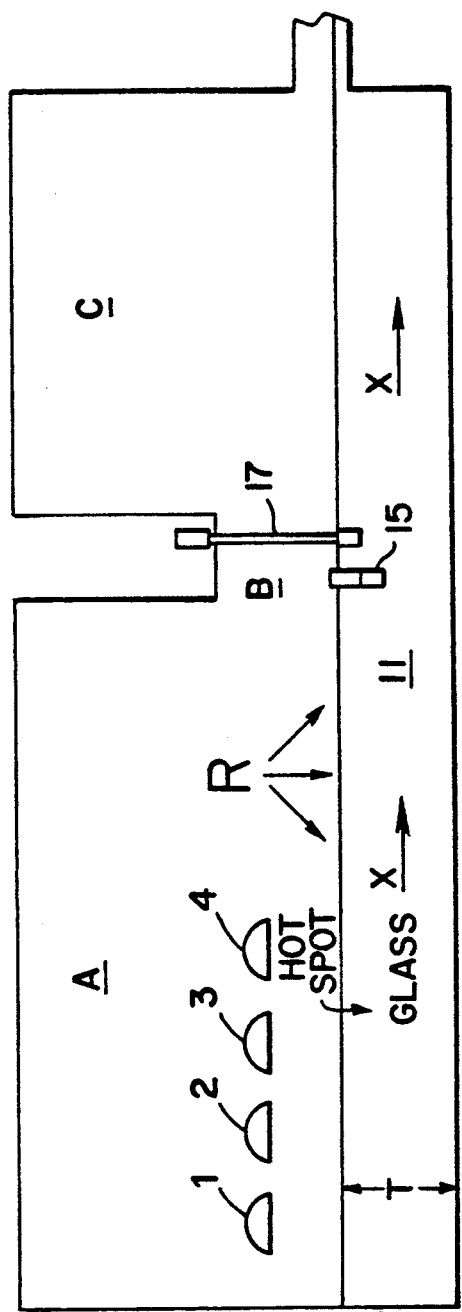
FIG. 2 is a side schematic view of the apparatus of FIG. 1 with a conventional batch hopper added thereto.

Referring to FIGS. 1-2, there is shown in schematic form a typical (conventional) glass making apparatus whose various parts and their operation are well known to the skilled artisan. Such apparatus may be used to form the glasses of this invention. In this respect, FIG. 1 illustrates the three, basic sequential zones in making glass, the liquid glass flowing in the direction of arrows X. Zone A is the melter. Zone B is referred to conventionally as the "waist" area. Zone C is the working area Refining of the glass takes place between port 4 and waist area B. This area is designated generally as "R". From this working Zone C the liquid glass flows to a glass forming operation for solidifying the glass into its desired shape. For purposes of this invention, the preferred forming operation is a standard float glass operation for making sheet glass according to known float glass techniques. It is understood, however, that the invention is not limited to this or any other sheet making operation. There are instances where rounded, hollow, or other shapes of glass may be achieved using the glasses of this invention.

FIG. 2 is a side view of the apparatus of FIG. 1, except that it illustrates a typical batch hopper 7 and feeder 9 of known design for feeding the raw, unmelted batch into melting Zone A. Melting Zone A is heated, in conventional fashion by four cross-fired gas/air burner ports 1, 2, 3, 4. This creates a glass melt of thickness T. Typically this creates a "hot spot" in the glass melt 11 at an area somewhere around and between cross-ports 3 and 4. Melt Zone A is conventionally provided with skim pockets 13 just prior to waist area B. Then, in waist area B there is provided a waist cooler 15 and a plurality of stirrers 17. It has been found in the practice of this invention, by proper operator manipulation of the cooling effect of waist cooler 15 and stirrers 17 on a batch-by-batch basis, that proper mixing and convection flows are maintained so that the problem reported in U.S. Pat. No. 4,792,536 with regard to heat penetration due to an increasing amount of FeO being formed under the reducing conditions in the melt, is not significant and excellent glass flows and consistency are achieved. This, in turn, eliminates the need for special melting and refining apparatus as reported in this aforesaid patent.

In working Zone C conventional working of the glass melt takes place, so as to ready the glass for the glass forming operation which follows. From Zone C the glass is then sent to the forming operation via conventional canal 19.

No special atmospheric reducing conditions need be effected in the practice of this invention other than the conditions normally achieved when operating the above equipment in a conventional fashion. This is because reduction of the iron to FeO is controlled by reducing and oxidizing ingredients in the batch, such as by the use of carbon and salt cake ($Na_4 SO_4$), respectively. In this respect, it has been found rather critical in the practice of this invention to achieve $SO_3$ content in the final glass within a certain rather narrow range of about 0.20–0.25% by weight, in order that the characteristics set forth herein of solar performance (transmittances) and color be achieved. This rather narrow $SO_3$ content is reflective of the control of the oxidation states within the glass as it is being formed, which gives rise to these desirable characteristics.

Suitable batch materials useful in the practice of this invention include sand, soda ash, dolomite, limestone, sodium sulfate (salt cake), commercial iron oxide and carbon (e.g. conventional glass makers' carbon). The iron oxide is a conventional material, essentially all of which is $Fe_2O_3$. A typical batch which may be used in the practice of this invention for making approximately 2.3 mm thick glass sheets is as follows:

| Material | lb./batch | wt. % |
|---|---|---|
| Sand | 2424 | 59.66 |
| Soda Ash | 759 | 18.68 |
| Dolomite | 592 | 14.57 |
| Limestone | 197.6 | 4.86 |
| Salt Cake | 63.0 | 1.55 |
| Iron Oxide* | 25.25 | 0.62 |
| Carbon | 2.30 | 0.06 |
|  | 4063.15 | 100.00 |

*This iron oxide is a conventional rouge which by analysis is (by weight) 97.39% $Fe_2O_3$; 0.51% MgO; 0.11% CaO; 0.070% $TiO_2$; 1.13% $SiO_2$; and 1.24% $Al_2O_3$.

This glass has the following composition on a theoretical oxide basis:

|  | Material | wt. % |
|---|---|---|
|  | $Na_2O$ | 13.75 |
|  | MgO | 3.90 |
|  | $Al_2O_3$ | 0.15 |
|  | $SO_3$ | 0.23 |
|  | $K_2O$ | 0.04 |
|  | CaO | 8.72 |
| (Total iron as) | $Fe_2O_3$ | 0.78 |
|  | $SiO_2$ | 72.41 |
|  | FeO | 0.19 |

This glass, when produced in a thickness within the above-recited range of 3.7 mm–4.8 mm, will exhibit characteristics of solar management, dominant wavelength and color purity within the ranges contemplated by this invention.

Another typical batch found useful in this invention, particularly for making 2 mm and 4 mm thick glass sheets, is as follows:

| Material | lb./batch | wt. % |
|---|---|---|
| Sand | 2424 | 59.60 |
| Soda Ash | 759 | 18.66 |
| Dolomite | 592 | 14.56 |
| Limestone | 197.6 | 4.86 |
| Salt Cake | 63.0 | 1.55 |
| Iron Oxide* | 29.0 | 0.71 |
| Carbon | 2.3 | 0.06 |
|  | 4066.90 | 100.00 |

*Same rouge as described above.

When this batch is melted and refined in accordance with the above-described apparatus employing conventional melting techniques and formed by the conventional float process into 2 mm or 4 mm thick sheets, the following characteristics are achieved:

|  | 2 mm | 4 mm |
|---|---|---|
| Illuminant A (%) | 80.9 | 71.1 |
| UV transmittance (%) | 53.1 | 36.6 |
| Total Solar transmittance (%) | 60.6 | 42.9 |
| IR transmittance (%) | 47.0 | 19.8 |
| Illuminant D-65 (average) |  |  |
| L | 92.6 | 88.5 |
| a | −4.35 | −8.31 |
| b | 0.89 | 1.55 |
| Illuminant C dominant wavelength (average) | 501 | 501 |
| x | .3050 | .2996 |
| y | .3207 | .3245 |
| Color purity (%) | 1.6 | 3.3 |
| FeO/Total Iron as $Fe_2O_3$ | 0.2475 (24.75%) |  |
| % $Fe_2O_3$ (total iron) to reduction* | 27% |  |

*Calculated by the method of the '133 patent.

By analysis the glass was found to have the following composition on an oxide basis:

|  | Material | wt. % |
|---|---|---|
|  | $Na_2O$ | 13.67 |
|  | MgO | 3.91 |
|  | $Al_2O_3$ | 0.17 |
|  | $SO_3$ | 0.21 |
|  | $K_2O$ | 0.04 |
|  | CaO | 8.70 |
| (Total iron as) | $Fe_2O_3$ | 0.889 |
|  | $SiO_2$ | 72.41 |
|  | FeO | 0.22 |

The above-described glass composition having an FeO to total iron (as $Fe_2O_3$) ratio of 0.2475 and a % $Fe_2O_3$ (total iron) to FeO reduction (calculated by the method of the '133 patent) of 27% was formed into various thickness and the Ill. C dominant wavelength and color purity was determined. The tests demonstrate the affect of thickness on color purity and the relative lack of affect on dominant wavelength. The following are the results obtained.

| Thickness |  | Dominant | Optical |
|---|---|---|---|
| inches | mm | Wavelength | Purity |
| .224* | 5.7 mm | 500.8 | 4.6 |
| .155 | 3.9 mm | 501.5 | 3.3 |
| .1585 | 4.0 mm | 502.0 | 3.3 |
| .157 | 4.0 mm | 501.5 | 3.3 |
| .1565 | 4.0 mm | 500.9 | 3.3 |
| .187 | 4.75 mm | 502.5 | 3.8 |
| .165 | 4.2 mm | 500.7 | 3.5 |
| .116 | 2.9 mm | 500.5 | 2.6 |
| .178** | 4.5 mm | 501.2 | 3.7 |
| .112 | 2.8 mm | 500.9 | 2.3 |
| .167*** | 4.2 mm | 500.5 | 3.5 |
| .162*** | 4.1 mm | 501.2 | 3.3 |
| .167*** | 4.2 mm | 500.5 | 3.5 |
| .081 | 2.06 mm | 501.2 | 1.6 |
| .085 | 2.15 mm | 501.5 | 1.7 |

*two .112 inch sheets with a refractive index (RI) oil in between.
**two .089 inch sheet with an RI oil in between.
***two sheets of equal thickness with RI oil in between.

The above two glasses, while forming two preferred embodiments of this invention, are representative of the applicability of this invention to a rather narrowly defined type of soda-lime-silica glass which may, in preferred form, be represented by the following:

| | Material | wt. % |
|---|---|---|
| | Na$_2$O | about 12-20 |
| | MgO | about 3-5 |
| | Al$_2$O$_3$ | about 0.10-0.30 |
| | SO$_3$ | about 0.20-0.25 |
| | K$_2$O | about 0-0.1 |
| | CaO | about 8-10 |
| (Total iron as) | Fe$_2$O$_3$ | about 0.7-.95 |
| | SiO$_2$ | about 71.0-74.0 |
| | FeO | about 0.19-0.24 (preferably 0.20-0.24) |
| | FeO/Total Iron as Fe$_2$O$_3$ | about .24-.27 |
| | % Fe$_2$O$_3$ Reduction to FeO (by method of '133 patent) | about 25%-29% |

Such glasses when formed in accordance with this invention then achieve, without the use of CeO, TiO$_2$, MoO$_3$ or V$_2$O$_5$ as UV absorbing additives and at thicknesses of about 3.7 mm-4.8 mm the following desirable characteristics:

| Characteristic | Range |
|---|---|
| Illuminant A | >70% |
| UV transmittance | <38% |
| Total Solar transmittance | <44.5% |
| IR transmittance | about 18%-21% |
| Illuminant C dominant wavelength | about 495-510 nm |
| Illuminant D-65 | |
| L | about 87%-91% |
| a | about -8 ± 3 |
| b | about 2 + 2 |
| Color purity | about 2%-4% |

Once given the above disclosure many other features, modifications and improvements will become apparent to the skilled artisan. Such other features, modifications and improvements are therefore considered to be a part of this invention, the scope of which is to be determined by the following claims:

We claim:

1. A green-colored infrared energy and ultraviolet radiation absorbing glass consisting essentially of SiO$_2$, Na$_2$O, CaO, about 0.20-0.25% SO$_3$, about 0.7-0.95% total iron expressed as Fe$_2$O$_3$, about 0.19-0.24% ferrous iron expressed as FeO, and wherein said glass when between about 3.7 mm-4.8 mm thickness has a visible transmittance of greater than about 70%, an ultraviolet radiation transmittance of less than about 38% and a total solar transmittance of less than about 44.5%.

2. A green-colored glass according to claim 1 wherein said glass consists essentially of, on an oxide basis:

| | Material | wt. % |
|---|---|---|
| | Na$_2$O | about 12-20 |
| | MgO | about 3-5 |
| | Al$_2$O$_3$ | about 0.10-0.30 |
| | SO$_3$ | about 0.20-0.25 |
| | K$_2$O | about 0-0.1 |
| | CaO | about 8-10 |
| (Total iron as) | Fe$_2$O$_3$ | about 0.7-0.95 |
| | SiO$_2$ | about 71.0-74.0 |
| | FeO | about 0.20-0.24 |
| | % FeO reduction | about 25%-29% |
| | FeO/Total iron as Fe$_2$O$_3$ | about 0.24-0.27. |

3. A green-colored glass according to claim 2 wherein said glasses at a thickness of about 3.7 mm-4.8 mm have the following characteristics:

| Characteristic | Range |
|---|---|
| Illuminant A (visible transmittance) | >70% |
| UV transmittance | <38% |
| Total Solar transmittance | <44.5% |
| IR transmittance | 18-21% |
| Illuminant C dominant wavelength | about 495-510 nm |
| Illuminant D-65 | |
| L | about 87-91% |
| a | about -8 ± 3 |
| b | about 2 ± 2 |
| Color purity | about 2%-4%. |

4. A green-colored glass according to claim 1 wherein said glass consists essentially of, on an oxide basis:

| | Material | wt. % |
|---|---|---|
| | Na$_2$O | about 13.75 |
| | MgO | about 3.90 |
| | Al$_2$O$_3$ | about 0.15 |
| | SO$_3$ | about 0.23 |
| | K$_2$O | about 0.04 |
| | CaO | about 8.72 |
| (Total iron as) | Fe$_2$O$_3$ | about 0.78 |
| | SiO$_2$ | about 72.41 |
| | FeO | about 0.19. |

5. A green-colored glass according to claim 4 wherein said glass in a laminated vehicular windshield having a glass thickness exclusive of laminate, of about 4.6 mm.

6. A green-colored glass according to claim 3 wherein said glass consists essentially of, on an oxide basis:

| | Material | wt. % |
|---|---|---|
| | Na$_2$O | about 13.67 |
| | MgO | about 3.91 |
| | Al$_2$O$_3$ | about 0.17 |
| | SO$_3$ | about 0.21 |
| | K$_2$O | about 0.04 |
| | CaO | about 8.70 |
| (Total iron as) | Fe$_2$O$_3$ | about 0.889 |
| | SiO$_2$ | about 72.41 |
| | FeO | about 0.22. |

7. A green-colored glass according to claim 6 wherein said glass is about 4 mm thick and is an automotive glass article.

8. A green-colored glass according to claim 3 wherein said Illuminant C dominant wavelength is about 500-502.

9. A green-colored glass according to claim 1 wherein said glass is float glass.

10. The method of forming a green glass which consists essentially of, on an oxide basis:

| Material | wt. % |
|---|---|
| Na$_2$O | about 13.75 |
| MgO | about 3.90 |
| Al$_2$O$_3$ | about 0.15 |
| SO$_3$ | about 0.23 |
| K$_2$O | about 0.04 |
| CaO | about 8.72 |

|                | Material | wt. % |
|---|---|---|
| (Total iron as) | $Fe_2O_3$ | about 0.78 |
|  | $SiO_2$ | about 72.41 |
|  | FeO | about 0.19 | said green glass when between about 3.7 mm–4.8 mm thickness having a visible transmittance of greater than about 70%, an ultraviolet radiation transmittance of less than about 38% and a total solar transmittance of less than about 44.5%; the steps including forming said glass from a batch material consisting essentially of by weight:

| Material | wt. % |
|---|---|
| Sand | about 59.66 |
| Soda Ash | about 18.68 |
| Dolomite | about 14.57 |
| Limestone | about 4.86 |
| Salt Cake | about 1.55 |
| Iron Oxide | about 0.62 |
| Carbon | about 0.06. |

11. The method of forming a green glass which consists essentially of, on an oxide basis:

| Material | wt. % |
|---|---|
| $Na_2O$ | about 13.67 |
| MgO | about 3.91 |
| $Al_2O_3$ | about 0.17 |
| $SO_3$ | about 0.21 |
| $K_2O$ | about 0.04 |
| (Total iron as) | CaO | about 8.70 |
|  | $Fe_2O_3$ | about 0.889 |
|  | $SiO_2$ | about 72.41 |
|  | FeO | about 0.22 | said green glass when between about 3.7 mm–4.8 mm thickness having the following characteristics:

| Characteristic | Range |
|---|---|
| Illuminant A (visible transmittance) | >70% |
| UV transmittance | <38% |
| Total Solar transmittance | <44.5% |
| IR transmittance | 18%–21% |
| Illuminant C dominant wavelength | about 495–510 nm |
| Illuminant D-65 |  |
| L | about 87%–91% |
| a | about −8 ± 3 |
| b | about 2 ± 2 |
| Color purity | about 2%–4% | the steps including forming said glass from a batch material consisting essentially of by weight:

| Material | wt. % |
|---|---|
| Sand | about 59.60 |
| Soda Ash | about 18.66 |
| Dolomite | about 14.56 |
| Limestone | about 4.86 |
| Salt Cake | about 1.55 |
| Iron Oxide | about 0.71 |
| Carbon | about 0.06 | and wherein during said forming of said glass the total iron expressed as $Fe_2O_3$ is reduced about 27%.

* * * * *